United States Patent [19]

Smith

[11] Patent Number: 5,000,122
[45] Date of Patent: Mar. 19, 1991

[54] HORSE FEEDER

[76] Inventor: A. L. Smith, R.R. 3, Box 446, Leavenworth, Kans. 66048

[21] Appl. No.: 484,694

[22] Filed: Feb. 23, 1990

[51] Int. Cl.$^5$ .......................... A01K 1/10; A01K 5/01
[52] U.S. Cl. ........................................ 119/58; 119/60; 119/61
[58] Field of Search ....................... 119/58, 59, 61, 60, 119/62, 63, 103

[56] References Cited

U.S. PATENT DOCUMENTS

| | | | |
|---|---|---|---|
| 247,346 | 9/1881 | Hendrick | 119/58 |
| 390,259 | 10/1888 | Schwartz | 119/58 |
| 1,032,747 | 7/1912 | Evans | 119/58 |
| 1,175,650 | 3/1916 | McCollough | 119/58 |
| 1,698,355 | 1/1929 | Wiemer | 119/61 |
| 1,918,729 | 7/1933 | Whitmer | 119/61 |
| 2,688,289 | 9/1954 | Sterling | 119/103 |
| 2,713,321 | 7/1955 | Keen | 119/61 |
| 2,735,402 | 2/1956 | De Lorenzo | 119/61 |
| 3,004,518 | 10/1961 | Struckoff | 119/58 |

Primary Examiner—Paul J. Hirsch
Attorney, Agent, or Firm—Zarley, McKee, Thomte Voorhees & Sease

[57] ABSTRACT

A horse feeder includes a ground supported frame with a basket portion pivotally mounted on the frame for holding hay or similar feeding material. The basket has forward and rearward walls formed of racks to allow horses to pull hay through the rack for feeding. A pair of side walls connect the racks and orient them so as to diverge from the lower end, to receive hay between the forward and rearward racks. The basket is pivotally mounted for selective pivotal movement between a generally upright feeding position and a loading position with the basket pivoted to one side. A handle with a projecting leg is operably mounted to the ground supported frame such that the projecting leg may be selectively journaled through a hole in the adjacent side panel of the basket portion. One hole is located in the basket portion such that the basket will be locked in an upright position. A second hole is located such that the basket will be locked in the loading position, oriented to one side. The handle is spring biased such that the projecting leg will remain in the locked position until manually released. A feed pan is mounted on the frame below the basket portion to receive hay falling from the racks, and to hold grain or other feed for the horses.

2 Claims, 3 Drawing Sheets

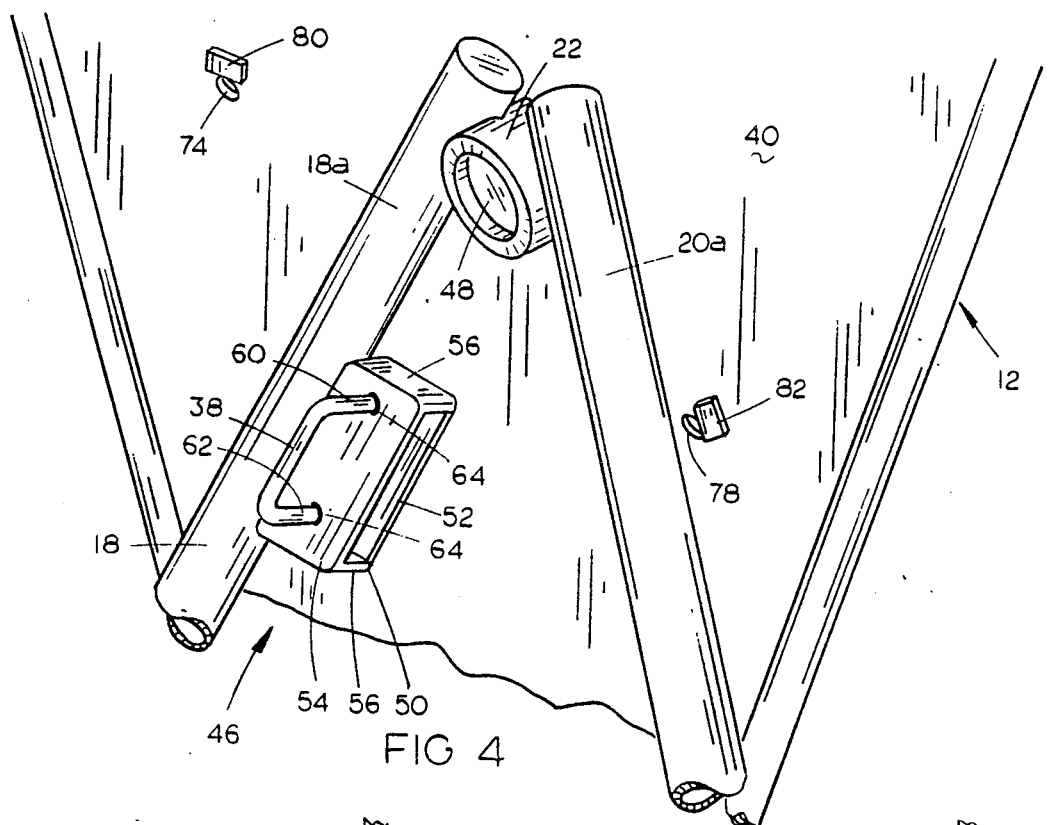
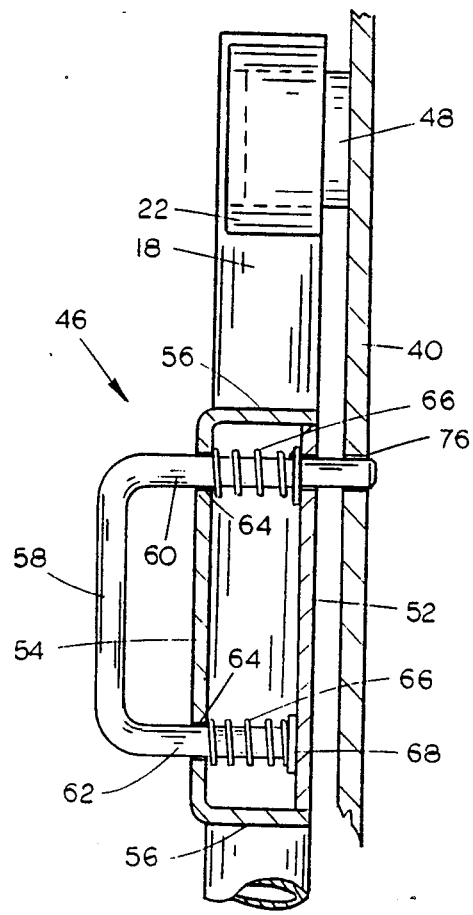
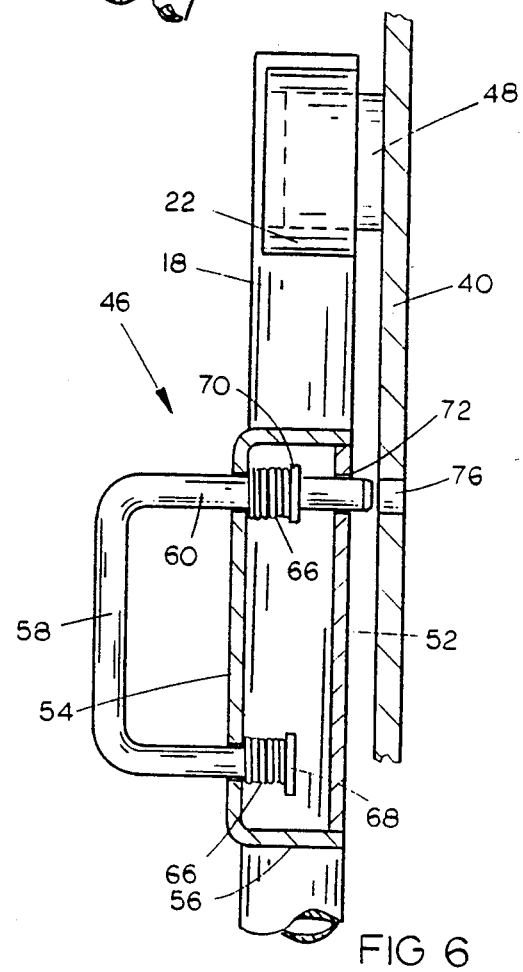

HORSE FEEDER

TECHNICAL FIELD

The present invention relates generally to horse feeders, and more particularly to an improved horse feeder which permits simple loading of feed material therein.

BACKGROUND OF THE INVENTION

While many types of horse feeders exist, they all typically utilize a series of spaced-apart vertically oriented rods to retain a hay bale therein. The horse pulls hay from the hay bale between the vertical rods, as desired. Such horse feeders are mounted at a height of approximately five to six feet, so that the horse does not bend over while pulling hay from the feeder.

One problem associated with conventional hay feeders is that the hay bale must be lifted overhead to a height of six or seven feet in order to place the bale within the feeder. In a large operation, such efforts become strenuous and tiring.

Lifting hay bales overhead and into a feeder is also a messy job, since hay and dirt will fall onto the person loading the hay feeders during the entire operation.

A further problem with conventional horse feeders is the amount of hay which is wasted by falling to the ground. Not only is such feed material difficult for the horse to retrieve, but the hay can become contaminated with parasite eggs on the ground. Eating from the ground can also cause a horse to eat sand and other materials along with the hay, potentially causing colic.

It is therefore a general object of the present invention to provide an improved horse feeder.

Another object of the present invention is to provide a horse feeder which eliminates the need for lifting hay bales over the head.

A further object is to provide a horse feeder which helps in eliminating waste, by preventing feed from dropping to the ground.

Still another object of the present invention is to provide a horse feeder which may offer both hay and grain to a feeding horse.

Yet another object is to provide a horse feeder which is economical to manufacture, simple to use and refined in appearance.

These and other objects of the present invention will be apparent to those skilled in the art.

SUMMARY OF THE INVENTION

The horse feeder of the present invention includes a ground supported frame with a basket portion pivotally mounted on the frame for holding hay or similar feeding material. The basket has forward and rearward walls formed of racks to allow horses to pull hay through the rack for feeding. A pair of side walls connect the racks and orient them so as to diverge from the lower end up, to receive hay between the forward and rearward racks. The basket is pivotally mounted for selective pivotal movement between a generally upright feeding position and a loading position with the basket pivoted to one side. A handle with a projecting leg is operably mounted to the ground supported frame such that the projecting leg may be selectively journaled through a hole in the adjacent side panel of the basket portion. One hole is located in the basket portion such that the basket will be locked in an upright position. A second hole is located such that the basket will be locked in the loading position, oriented to one side. The handle is spring biased such that the projecting leg will remain in the locked position until manually released. A feed pan is mounted on the frame below the basket portion to receive hay falling from the racks, and to hold grain or other feed for the horses.

BRIEF DESCRIPTION OF THE DRAWINGS

FIG. 4 is an enlarged perspective view of one end of the hay basket of the present invention;

FIG. 5 is a sectional view taken at lines 5—5 in FIG. 2; and

FIG. 6 is a sectional view similar to FIG. 5, but with the locking handle moved to a second position.

DESCRIPTION OF THE PREFERRED EMBODIMENT

Figure 1:
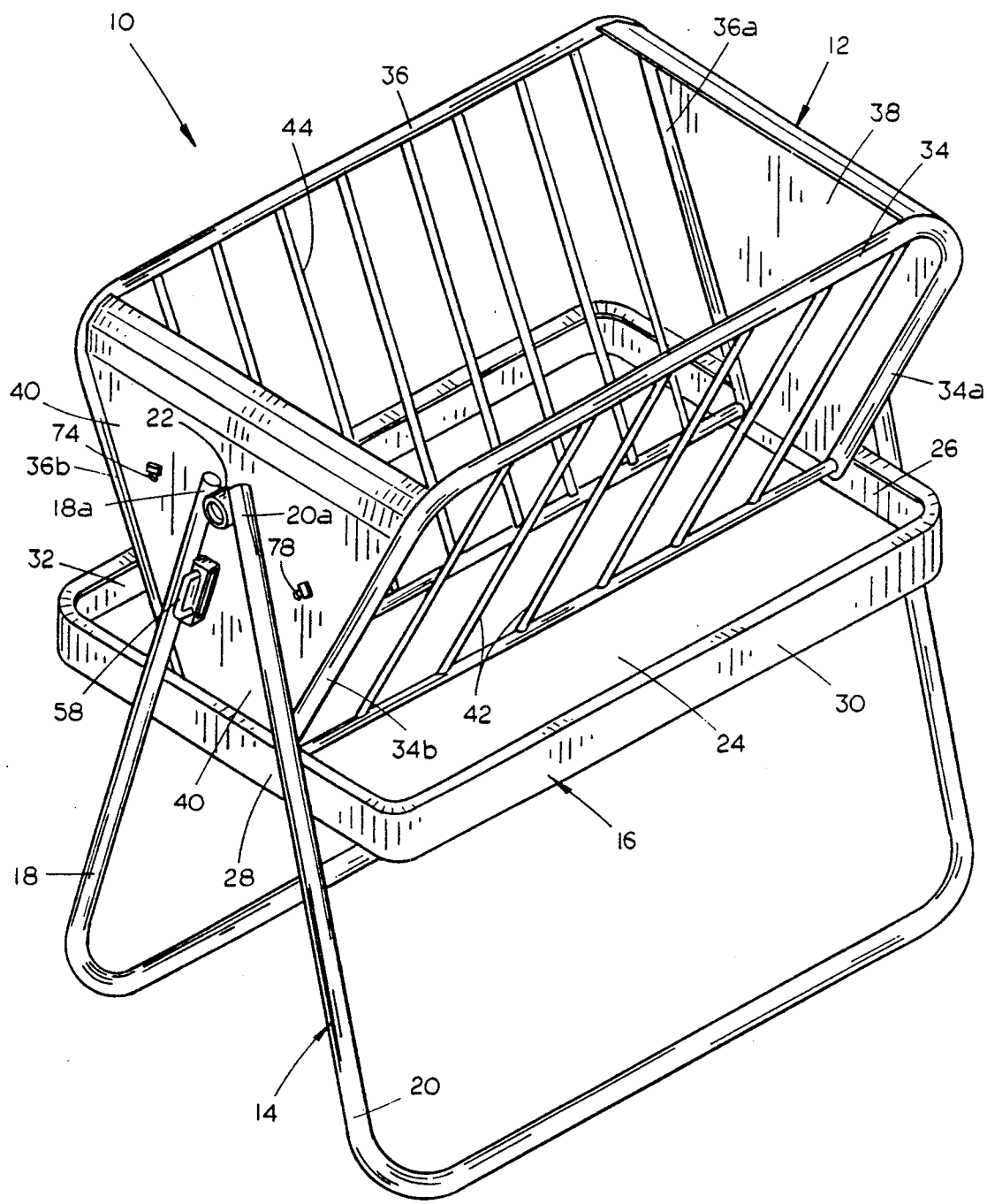
FIG. 1 is a perspective view of the present invention.

Referring now to the drawings, in which identical or corresponding parts are identified with the same reference numeral, and more particularly to FIG. 1, the horse feeder of the present invention is designated generally at 10 and includes a basket 12 pivotally mounted to a support frame 14, with a feed pan 16 mounted below basket 12.

Support frame 14 includes first and second U-shaped leg members, connected together at their upper free ends 18a and 20a respectively. A short bearing sleeve 22 is mounted between upper ends 18a and 20a of U-shaped members 20, to pivotally support basket 1, as described in more detail hereinbelow. U-shaped leg members 18 and 20 extend downwardly and diverge from their connection at upper ends 18a and 20a, to form a free-standing support frame.

Feed pan 16 includes a generally rectangular bottom 24 with a pair of upstanding and opposing side walls 26 and 28 and opposing and upstanding forward and rearward walls 30 and 32. Walls 26–32 of feed pan 16 extend upwardly approximately six inches, in order to help trap hay and other material from spilling out of the feed pan.

Basket 12 is formed from a pair of forward and rearward spaced apart racks 34 and 36 connected together by a pair of opposing side panels 38 and 40 along their side edges 34a and 36a, and 34b and 36b. Each side panel 38 and 40 is formed in the shape of a truncated triangle, such that forward and rearward racks 34 and 36 diverge upwardly to form a generally V-shaped basket 12. Forward rack 34 includes a plurality of vertically oriented and horizontally spaced apart rods 42, the rods being spaced apart a distance to allow a horse to pull hay from between the rods. Preferably, the distance between rods 42 is approximately three inches, to reduce hay waste. Rearward rack 36 has similarly spaced and oriented rods 44, so that horses may feed from either the forward or rearward sides of basket 12.

Referring now to FIGS. 4–6, a locking mechanism is designated generally at 46 and is designed to selectively prevent pivotal movement of basket 12. End panel 40 of basket 12 has a pin 48 projecting therefrom which is journaled within bearing sleeve 22, such that basket 12 is pivotal at bearing sleeve 22. A similar pin and bearing sleeve is located on panel 38, although it is not specifically shown in the drawings, such that basket 12 is pivotable about a horizontal axis located generally centrally through side panels 38 and 40.

Locking mechanism 46 includes a frame 50 mounted to leg 18, frame 50 including an inner plate 52 parallel and adjacent side panel 40, and an outer plate 54 parallel and spaced from inner plate 52. A pair of side walls 56 connect inner and outer plates 52, as shown in the drawings. A generally U-shaped handle 58 having upper and lower legs 60 and 62, respectively, is operably mounted to frame 50. Legs 60 and 62 are slidably mounted through a pair of apertures 64, each leg having a coil spring 66 operably mounted thereon between inner and outer plates 52 and 54. A stop plate 68 is mounted to the free end of leg 62 so as to compress coil spring 66 against outer plate 54 when handle 58 is pulled outwardly, as shown in FIG. 6. Similarly, a stop plate 70 is mounted on leg 60 to compress coil springs 64 when handle 58 is pulled outwardly.

Upper leg 60 of handle 58 is longer than lower leg 62, and is slidably journaled through an aperture 72 through inner plate 52. Leg 60 of handle 58 is located to correspond with three holes, designated generally as left hole 74, central hole 76 and right hole 78, in FIGS. 4-6. Holes 76-78 are located radially equidistant from the pivotal axis of basket 12, on panel 40, as measured from pin 48. In this way, pivotal movement of basket 12 will align one of apertures 74, 76 or 78 with leg 60. It can therefore be seen that the biasing force of springs 66 will journal leg 60 within one of holes 74, 76 or 78 upon alignment of the particular hole with leg 60. Leg 60 is of a length which will permit removal of leg 60 from the particular hole 74, 76 or 78, upon pulling of handle 58 against the biasing force of springs 66.

A projecting plate 80 is affixed to panel 40 adjacent left hole 74, which projects from the surface of panel 40 so as to contact leg 60 to prevent pivotal movement of basket 12 beyond left hole 74. A similar projecting plate 82 is affixed to panel 40 adjacent right hole 78 for a similar purpose.

Figure 3:
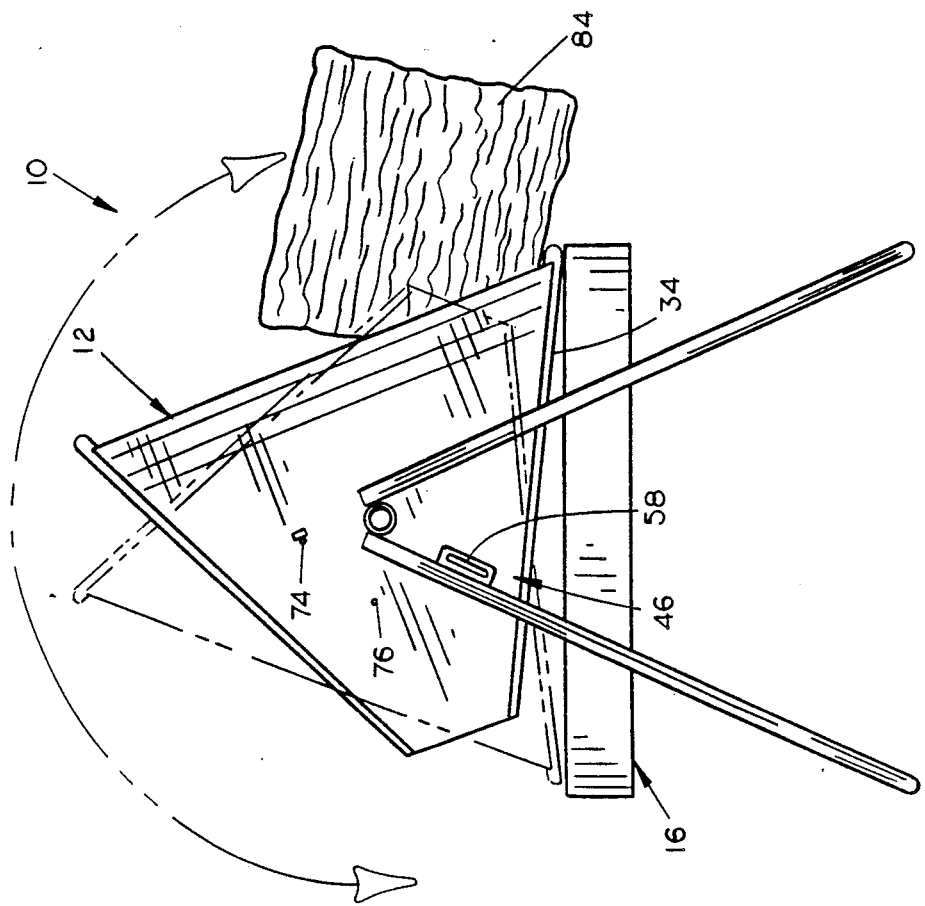
FIG. 3 is a side elevational view similar to FIG. 2, but with the hay basket tipped to one side.
Figure 2:
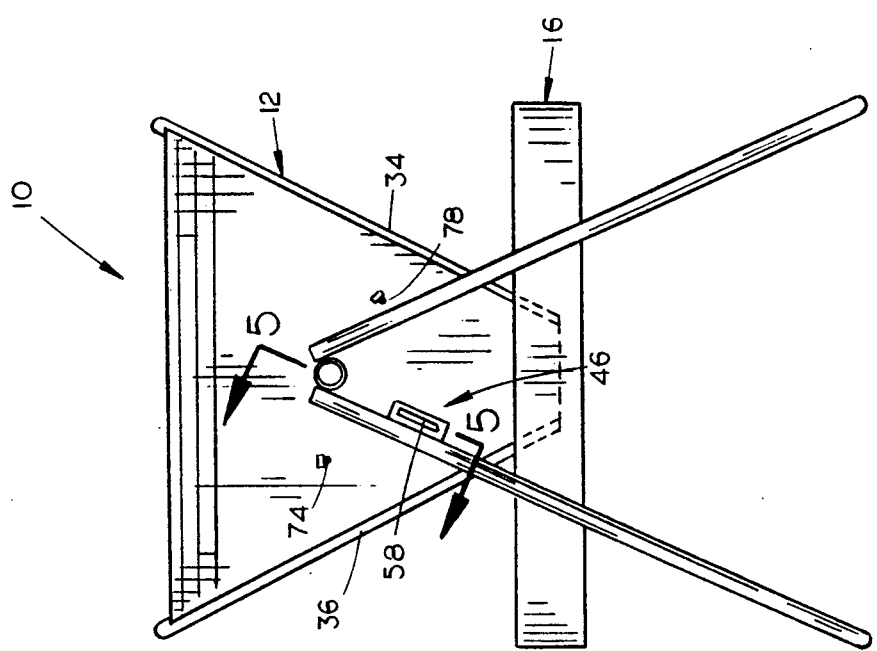
FIG. 2 is a side elevational view of the present invention.

In operation, horse feeder 10 is locked in a feeding position with basket 12 oriented in an upright position as shown in FIG. 2. Basket 12 is locked in position with leg 60 of handle 58 journaled in hole 76, as shown in FIG. 5. In order to load a hay bale 84 (see FIG. 3) into basket 12, handle 58 is pulled outwardly against the bias of coil springs 66, as shown in FIG. 6, to remove leg 60 from hole 76. Basket 12 is then pivoted on pin 48, as shown in FIG. 3, until leg 60 of handle 58 is journaled in either hole 78 or hole 74. FIG. 3 shows basket 12 tipped to the right, with leg 60 of handle 58 journaled in right hole 78. The broken line drawing of FIG. 3 shows the position of basket 12 tipped to the left for loading. When basket 12 is tipped to the right, forward rack 34 is oriented in a generally horizontal position, such that a hay bale may be easily transferred from a pickup or the like directly into basket 12. Basket 12 is then returned to its upright position by pulling on handle 58 and allowing springs 66 to lock leg 60 in central hole 76, as shown in FIG. 2. In this position any hay falling from forward rack 34 or rearward rack 36 will drop into feed pan 16, rather than to the ground.

Preferably, all edges of components horse feeder 10 are rounded or blunted in order to prevent injury to animals using the feeder.

Whereas the invention has been shown and described in connection with the preferred embodiment thereof, it will be understood that many modifications, substitutions and additions may be made which are within the intended broad scope of the appended claims. Thus, there has been shown and described an improved horse feeder which accomplishes at least all of the above-stated objects.

I claim:

1. A horse feeder, comprising:
a ground supported frame;
a basket portion pivotally mounted on said frame, for holding feeding material, said basket portion having an open upper end, opposing sides and forward and rearward walls;
said basket pivotally mounted for selective pivotal movement between a generally upright feeding position, and a loading position wherein said basket is pivoted to an orientation with said open upper end disposed to one side to receive feed material;
said basket being pivotally mounted on each side to said frame, such that the pivotal axis is generally horizontal and extends from side to side, generally parallel to said forward and rearward walls;
said pivotal axis being located generally centrally through said sides;
a feed pan mounted to said frame below said basket, said feed pan having dimensions so as to receive any feed material dropping from said basket;
said feed pan has a side wall projecting upwardly from the entire periphery thereof, to prevent spillage of feed from the feed pan;
said forward wall including a rack, said rack having a plurality of vertically and spaced-apart rods extending between upper and lower frame members, said rods spaced apart a distance to permit an animal to pull feed material through said rack;
means for selectively locking said basket to prevent pivotal movement, including a pin operably mounted to said frame for movement towards and away from a first side panel, and said first side panel having a hole therethrough positioned for selective alignment with said pin, such that said pin will be received therein when said basket is pivoted to the feeding position;
said pin being spring biased so as to be biased into journaled engagement with said hole;
said first side panel having a second hole therein and spaced from said first hole, said first and second holes being radially equidistant from the pivotal axis of said basket, said second hole being positioned for selective alignment with said pin such that said pin will be received therein when said basket is pivoted to a loading position; and
stop means mounted on said first side panel, for preventing pivotal movement of said basket beyond said loading position.

2. The horse feeder of claim 1, wherein said basket forward and rearward walls diverge from their bottom ends to their top ends so as to funnel feed material from the top to bottom therein.

* * * * *